US008192126B1

(12) United States Patent
Young

(10) Patent No.: US 8,192,126 B1
(45) Date of Patent: Jun. 5, 2012

(54) MOBILE HOIST SYSTEM

(75) Inventor: Larry P. Young, Grand Forks, ND (US)

(73) Assignee: Telpro, Inc., Grand Forks, ND (US)

( * ) Notice: Subject to any disclaimer, the term of this patent is extended or adjusted under 35 U.S.C. 154(b) by 512 days.

(21) Appl. No.: 12/496,186

(22) Filed: Jul. 1, 2009

Related U.S. Application Data

(63) Continuation-in-part of application No. 11/672,516, filed on Feb. 7, 2007, now Pat. No. 7,556,464.

(51) Int. Cl.
*B66D 3/00* (2006.01)
*B66D 3/22* (2006.01)
*E04G 21/14* (2006.01)
*B60P 1/14* (2006.01)

(52) U.S. Cl. ........... 414/10; 254/903; 254/375; 187/288

(58) Field of Classification Search .................. 187/235, 187/254, 288; 254/350, 358, 359, 365, 366, 254/368, 378, 379, 903; 414/10–12; 74/505
See application file for complete search history.

(56) References Cited

U.S. PATENT DOCUMENTS 1,795,058 A * 3/1931 Townsend .................... 188/82.9
2,543,765 A * 3/1951 Davidson et al. ............. 254/297
3,042,375 A * 7/1962 Fahey et al. ................... 254/269
3,645,519 A 2/1972 Schwarz et al.
3,828,942 A 8/1974 Young
3,915,022 A * 10/1975 Walton .......................... 74/99 R
4,103,872 A * 8/1978 Hirasuka ....................... 254/356
4,175,727 A * 11/1979 Clarke .......................... 254/274
4,372,535 A 2/1983 Gibson et al.
4,589,523 A * 5/1986 Olson et al. ................... 182/234
4,636,962 A * 1/1987 Broyden et al. ............. 700/228
4,683,994 A 8/1987 Weisenfelder
4,932,176 A 6/1990 Roberts et al.
5,002,259 A 3/1991 Manning et al.
5,078,364 A 1/1992 Harrell
5,316,265 A * 5/1994 Welch et al. .................. 254/362
5,368,429 A 11/1994 Young
5,374,035 A * 12/1994 Santos .......................... 254/339
7,080,825 B1 * 7/2006 George et al. ................ 254/267

OTHER PUBLICATIONS

Anglia Handling Services Ltd., Scaffold Hoists and Secure Pulley, <retrieved from http://www.angliahandling.co.uk/scaffold-lifting-hoists.html, Jul. 1, 2009 >, 2 pages.
HSS Hire Service Group Limited, Scaffold Hoists, <retrieved from http://www.hss.com/g/69412/150kg-Scaffold-Hoist-Elec.html, Jul. 1, 2009>, 3 pages.

(Continued)

*Primary Examiner* — Gregory Adams
(74) *Attorney, Agent, or Firm* — Neustel Law Offices

(57) ABSTRACT

A mobile hoist system for preventing the application of an overloading input force or an overloading weight force from an elevated load. The mobile hoist system generally includes a frame removably connected to a support structure, a drive assembly connected to the frame and a driven assembly connected to the frame and mechanically connected to the drive assembly via a main elongated member. The drive assembly includes a winch and a brake unit connected to the winch. The brake unit is capable of preventing lowering of a load up to a first torque limit. The driven assembly includes a drum having a strap wound thereon and a slip clutch to brake the drum. The slip clutch prevents slippage up to a second torque limit. The second torque limit is less than the first torque limit to prevent damage to the brake unit by the load having an excessive weight.

18 Claims, 13 Drawing Sheets

OTHER PUBLICATIONS

Lifting Equipment Direct Ltd., Scaffold Hoists, <retrieved from http://www.liftingequipmentdirectuk.co.uk/scaffold_hoist.html, Jul. 1, 2009>, 2 pages.

Lifting Equipment Direct Ltd., Manual Chain Hoists, retrieved from http://www.liftingequipmentdirectuk.co.uk/manual_chain_hoist.html, Jul. 1, 2009>, 1 page.

* cited by examiner

MOBILE HOIST SYSTEM

CROSS REFERENCE TO RELATED APPLICATIONS

I hereby claim benefit under Title 35, United States Code, Section 120 of U.S. patent application Ser. No. 11/672,516 filed Feb. 7, 2007 now U.S. Pat. No. 7,556,464. This application is a continuation in-part of the Ser. No. 11/672,516 application. The Ser. No. 11/672,516 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to drywall lifters and more specifically it relates to a mobile hoist system for reliably preventing the application of an overloading input force or an overloading weight force from an elevated load.

2. Description of the Related Art

Any discussion of the related art throughout the specification should in no way be considered as an admission that such related art is widely known or forms part of common general knowledge in the field.

Drywall lifters have been in use for years. A conventional drywall lifter is comprised of a telescoping structure attached to a base, an upper support attached to an upper portion of the telescoping structure and a drive unit mechanically connected to the telescoping structure to selectively lift and lower the telescoping structure. The drive unit may be manual or hydraulic. A drywall panel is positioned upon the upper support and is thereby raised to a desired position on a ceiling for securing by workers with conventional fasteners and then removed after fastening. U.S. Pat. No. 5,586,619 (hydraulic lifter) to Roland Young, U.S. Pat. No. 5,368,429 (manual lifter) to Roland Young and U.S. Pat. No. 3,828,942 (manual lifter) illustrate examples of conventional drywall lifters.

While some drywall lifters utilize a slip clutch on the input force side, they utilize a one way brake on the weight force side which limits the slip clutch to only usage one way from the input force side as illustrated in FIG. 1 of the drawings. Hence, if an overload weight force is applied, the one way brake is prone to breakage after a weight level has been reached which can result in damage to the drywall lifter and possibly personal injury.

Hence, there is a need for a drywall lifter that prevents an overload failure on the weight force side of the drywall lifter to prevent damage to the drywall lifter and to prevent personal injury.

BRIEF SUMMARY OF THE INVENTION

A system for reliably preventing the application of an overloading input force or an overloading weight force from an elevated load. The invention generally relates to a drywall lifter which includes a frame removably connected to a support structure, a drive assembly connected to the frame and a driven assembly connected to the frame and mechanically connected to the drive assembly via a main elongated member. The drive assembly includes a winch and a brake unit connected to the winch. The brake unit is capable of preventing lowering of a load up to a first torque limit. The driven assembly includes a drum having a strap wound thereon and a slip clutch to brake the drum. The slip clutch prevents slippage up to a second torque limit. The second torque limit is less than the first torque limit to prevent damage to the brake unit by the load having an excessive weight.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a two-way drywall lift overload protection system for reliably preventing the application of an overloading input force or an overloading weight force from an elevated load.

Another object is to provide a two-way drywall lift overload protection system that prevents an overload failure on the weight force side of the drywall lifter to prevent damage to the drywall lifter and to prevent personal injury.

An additional object is to provide a two-way drywall lift overload protection system that may be utilized upon various types of drywall lifters.

A further object is to provide a two-way drywall lift overload protection system that prevents the free falling of a load supported by a drywall lifter.

Another object is to provide a two-way drywall lift overload protection system that may be utilized upon manual drywall lifters and powered drywall lifters.

A further object is to provide a two-way drywall lift overload protection system that provides for controlled descending of an overloading weight force applied by a supported load.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
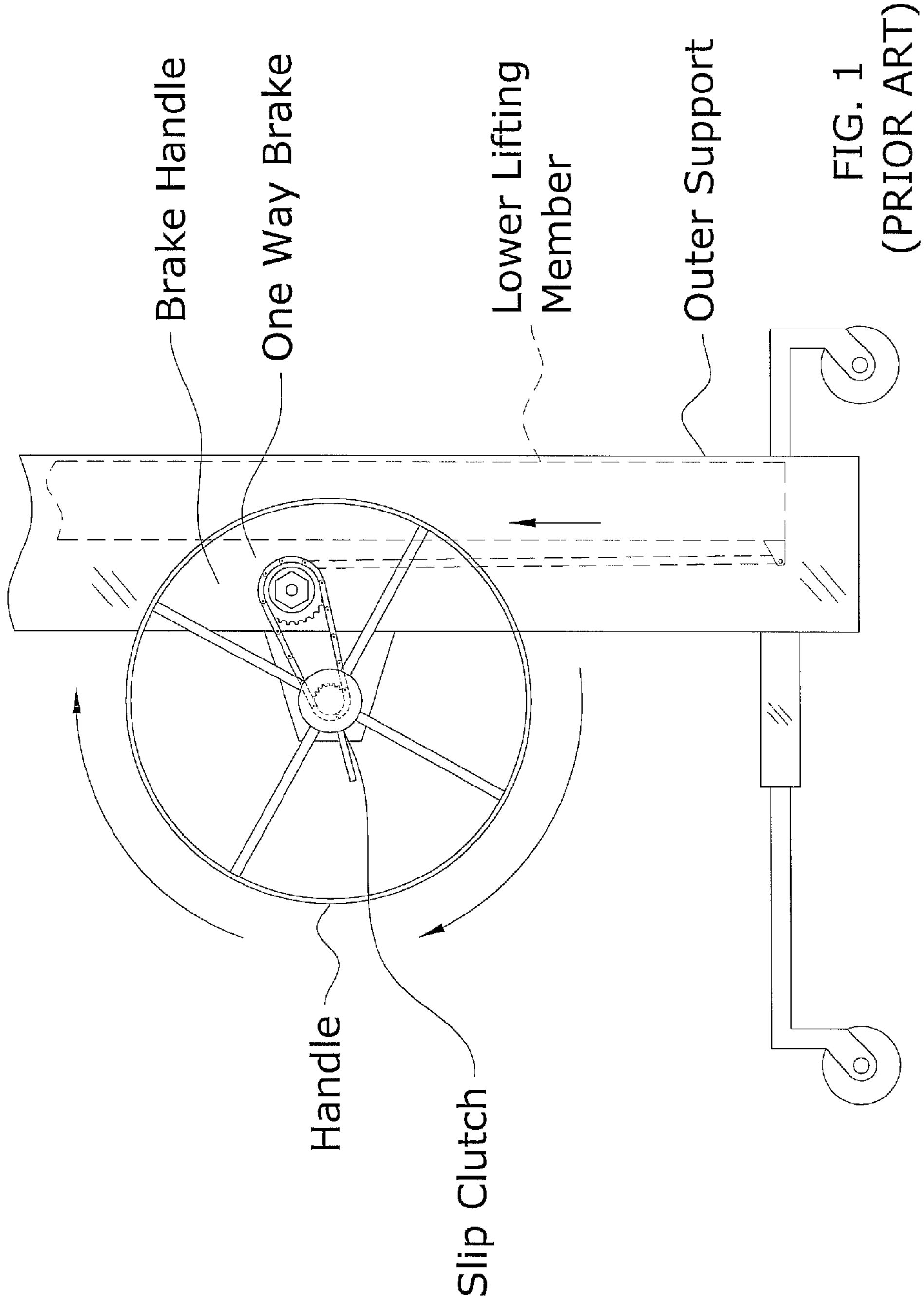
FIG. 1 (PRIOR ART)
FIG. 1 is a side view of a prior art overload protection system with the slip clutch connected to the input force side and with the one way brake connected to the weight force side.
Figure 2:
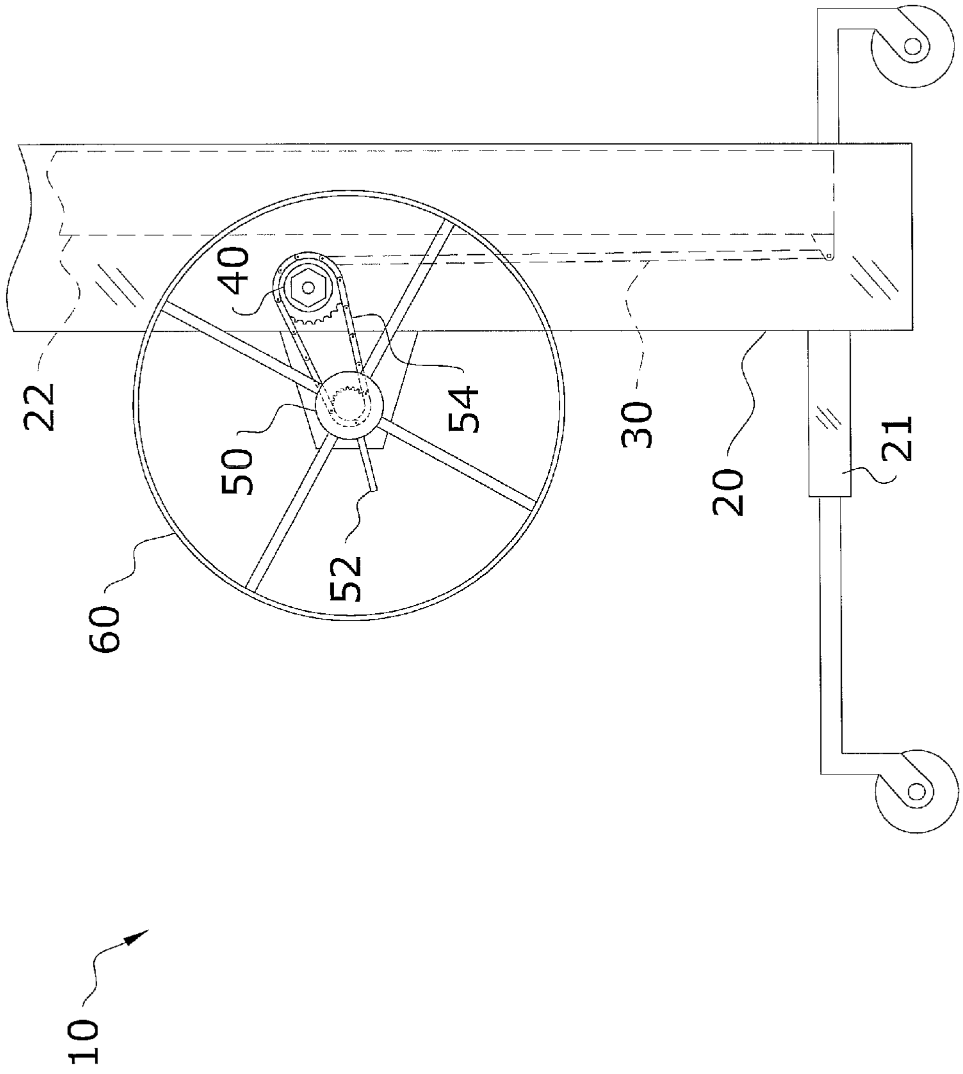
FIG. 2 is a side view of the present invention illustrating the one way brake connected to the input force side and the slip clutch connected to the weight force side.

I. Two-Way Drywall Lift Overload Protection System

A. Overview.

Turning now descriptively to the drawings, in which similar reference characters denote similar elements throughout the several views, FIGS. 2 through 7 illustrate a two-way drywall lift overload protection system, which comprises a telescoping drywall lifter to lift and lower a load 12, wherein said telescoping drywall lifter includes a plurality of legs 21, a lower lifting member 22, a plurality of telescoping lifting members 24 extending upwardly from said lower lifting member 22 and an upper support 26, a winch attached to said telescoping drywall lifter, a brake unit 50 connected to said winch, a slip clutch 40 mechanically connected to said telescoping drywall lifter to selectively extend and retract said lower lifting member 22 and said plurality of telescoping lifting members 24, and a main elongated member 54 connected between said winch and said slip clutch 40.

B. Telescoping Drywall Lifter.

Figure 3:
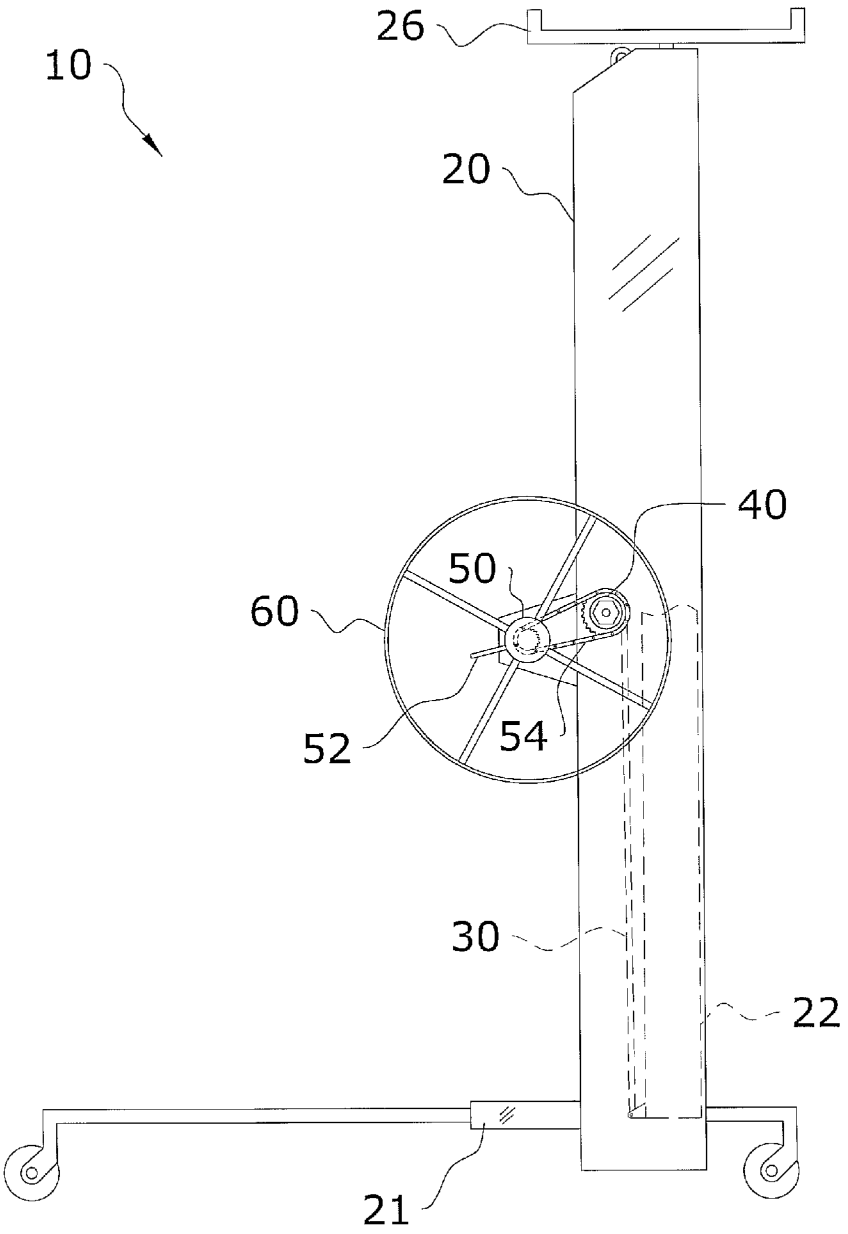
FIG. 3 is a side view of the present invention with the drywall lifter in a lowered position.
Figure 4:
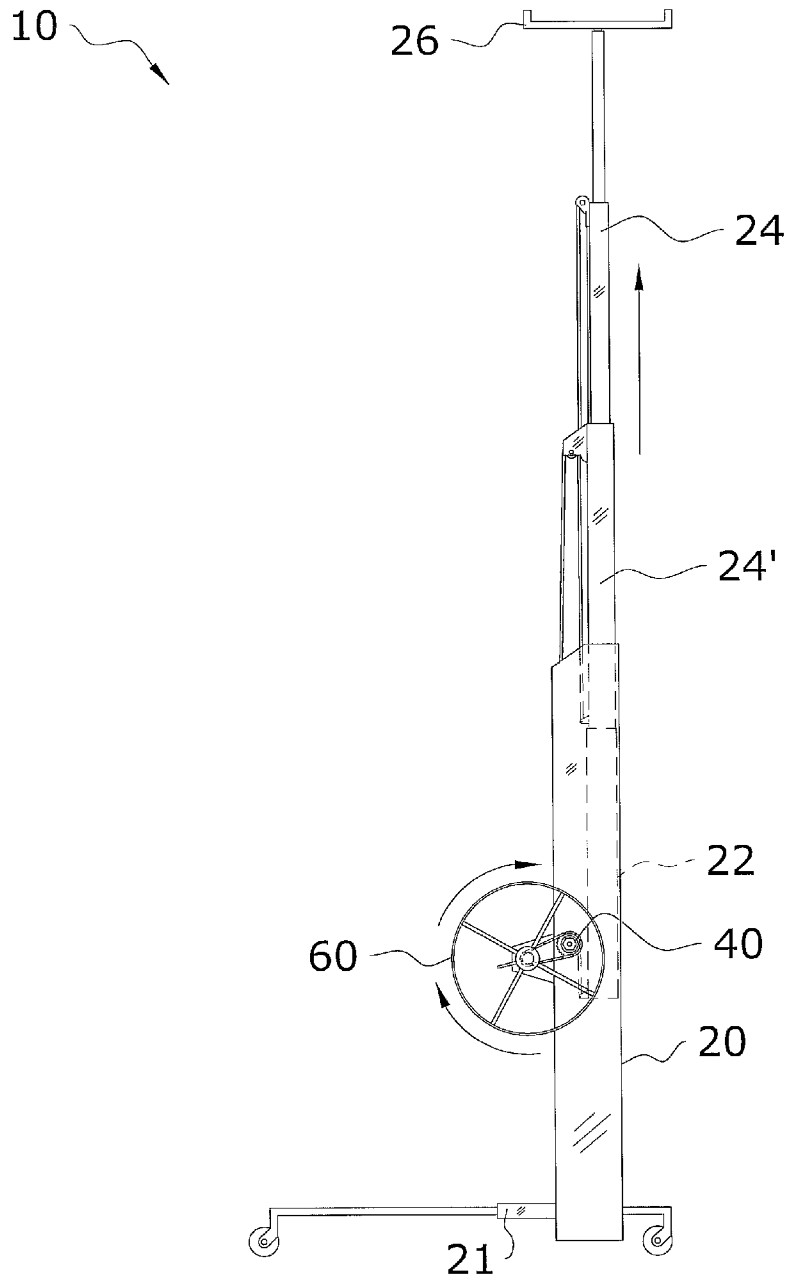
FIG. 4 is a side view of the present invention with the drywall lifter in the raised position.
Figure 5:
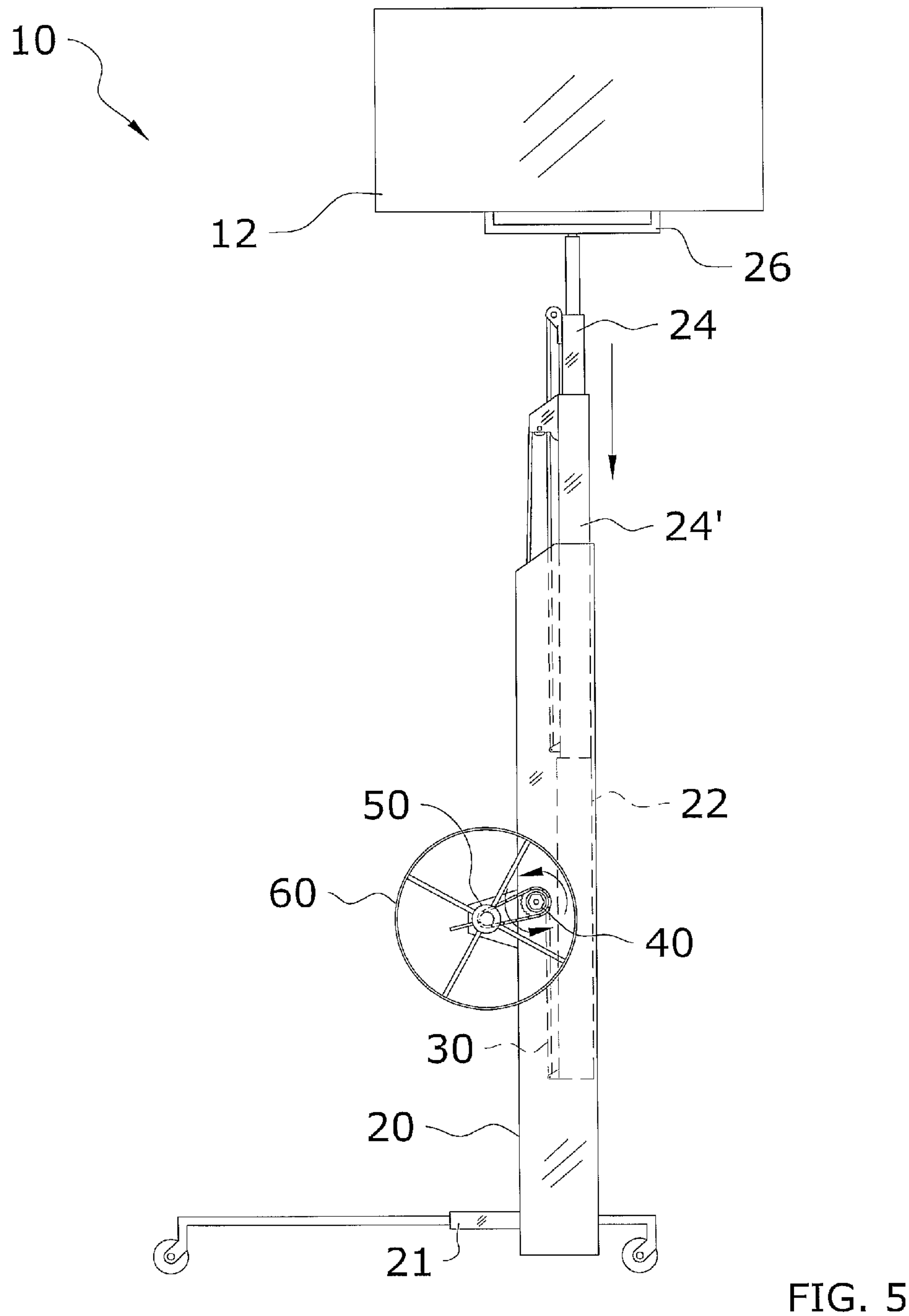
FIG. 5 is a side view of the present invention with the drywall lifter in the raised position supporting a load.

FIGS. 3 and 4 illustrate an exemplary telescoping drywall lifter. The telescoping drywall lifter is capable of lifting and lowering a load 12 such as but not limited to a drywall panel (e.g. plasterboard, paneling, wooden panels, composite panels, bricks and the like).

The telescoping drywall lifter includes a plurality of legs 21, a lower lifting member 22, a plurality of telescoping lifting members 24 extending upwardly from the lower lifting member 22 and an upper support 26. The lower lifting member 22 is vertically movable within an outer support 20 attached to the legs 21 as illustrated in FIG. 4 of the drawings. The outer support 20 is comprised of a tubular vertical structure that receives a significant portion of the telescoping structure when retracted as shown in FIGS. 1 through 4 of the drawings.

U.S. Pat. No. 5,586,619 (hydraulic lifter) to Roland Young, U.S. Pat. No. 5,368,429 (manual lifter) to Roland Young and U.S. Pat. No. 3,828,942 (manual lifter) illustrate examples of conventional drywall lifters that may be utilized within the present invention and are hereby incorporated by reference herein.

C. Winch.

The winch is attached to the telescoping drywall lifter and is used to mechanically lift and lower the lifting structure of the drywall lifter resulting in the corresponding lifting or lowering of a load 12. The winch may be comprised of a manually operated device (e.g. handle 60) or a motor operated device (e.g. hydraulic pump, electric motor). The winch is capable of inputting varying forces required to lift and lower a load 12 positioned upon the drywall lifter.

D. Brake Unit.

The brake unit 50 is connected to the winch to selectively prevent the telescoping drywall lifter or from lowering the load 12. The brake unit 50 is capable of preventing lowering of the load 12 up to a first torque limit which is comprised of a torque level that results in failure of the brake unit 50. A control lever 52 or similar structure is used to engage the brake unit to prevent rotation of the winch and the main elongated member 54. U.S. Pat. No. 3,828,942 to Young illustrates an exemplary brake unit 50 and is hereby incorporated by reference herein.

E. Slip Clutch.

A main elongated member 54 is connected between the winch and the slip clutch 40 to transfer mechanical force between the same. The main elongated member 54 is comprised of an endless loop structure such as but not limited to a chain or cable.

The slip clutch 40 is mechanically connected to the telescoping drywall lifter to selectively extend and retract the lower lifting member 22 and the plurality of telescoping lifting members 24 as shown in FIGS. 2 through 7 of the drawings. The slip clutch 40 prevents slippage up to a second torque limit. The slip clutch 40 is preferably adjustable to allow for adjustment of the second torque limit depending upon the application of usage.

The second torque limit is less than the first torque limit to prevent damage to the brake unit 50 by the load 12 having an excessive weight. It is preferable that the second torque limit is significantly less than the first torque limit to prevent continued exposure of the brake unit 50 to excessively heavy loads 12 (e.g. 500 pounds or more).

Figure 6:
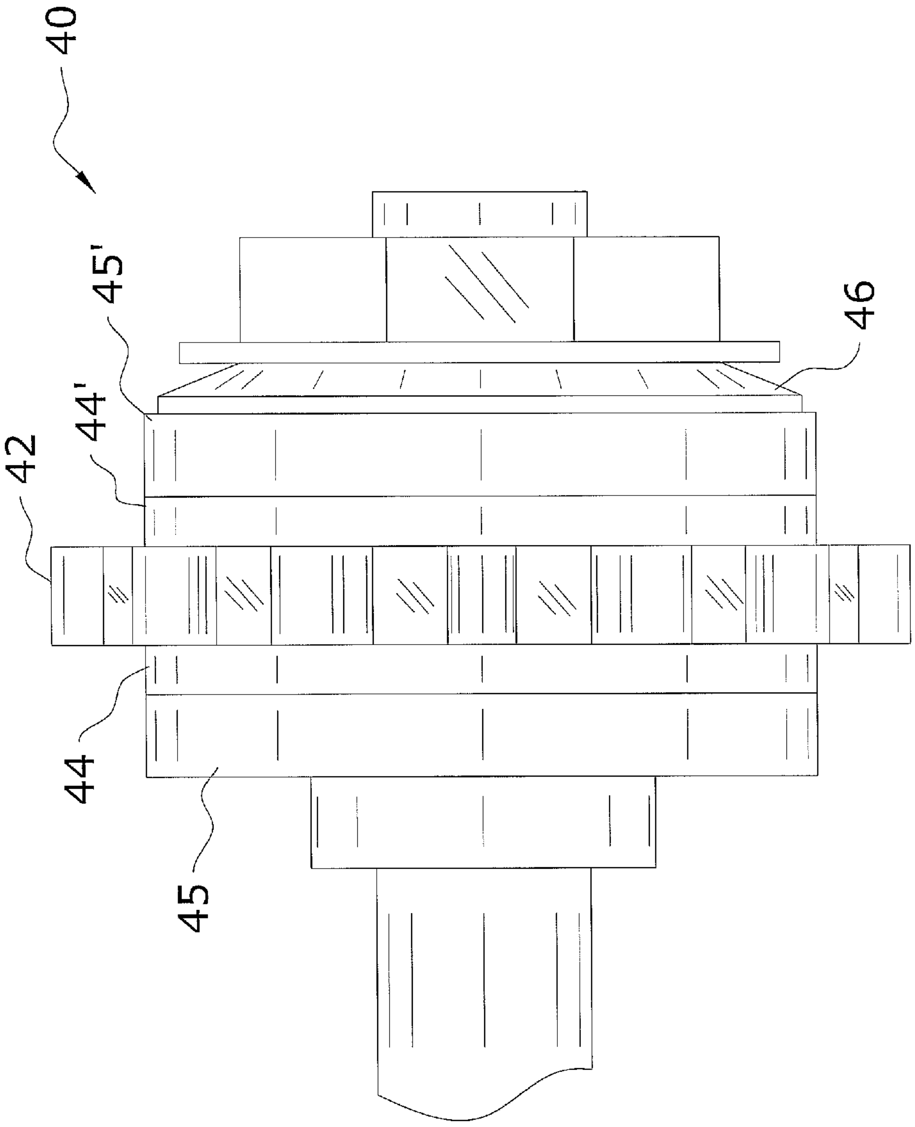
FIG. 6 is a front view of the slip clutch.
Figure 7:
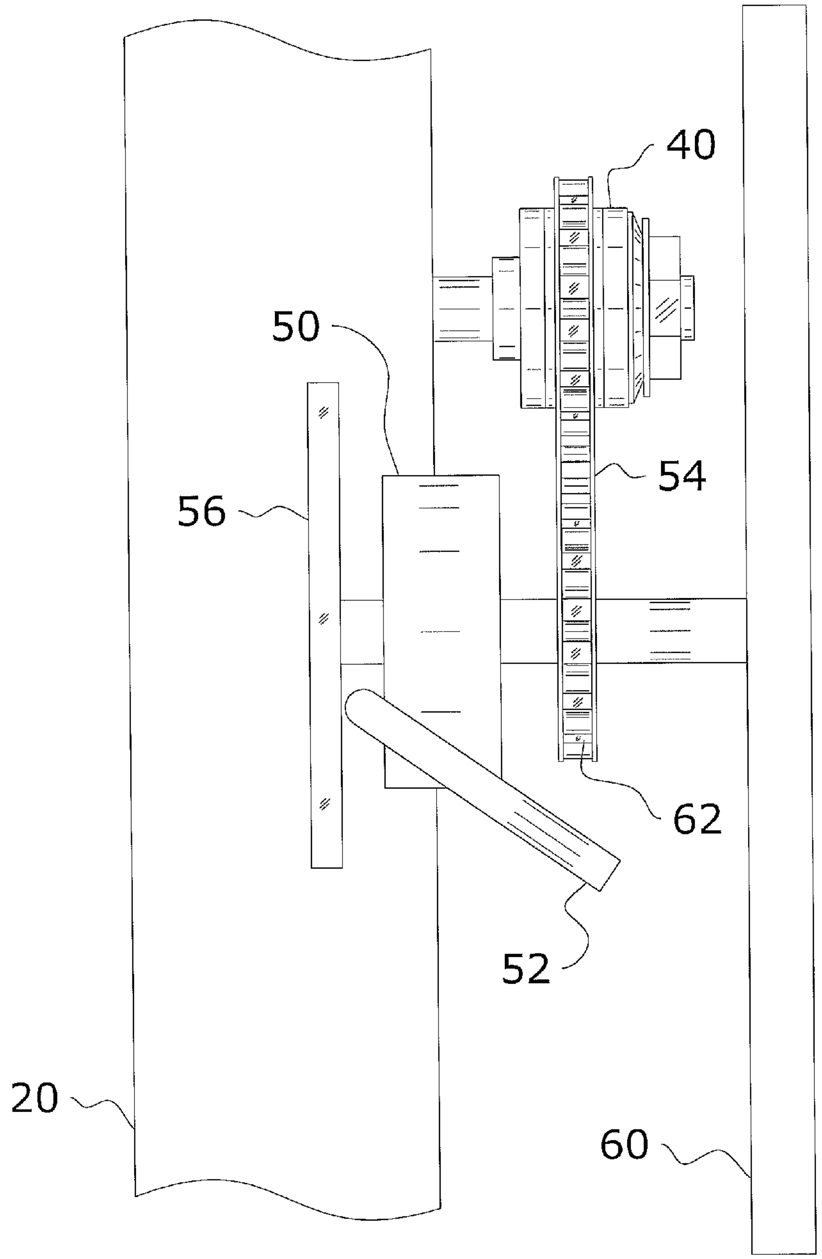
FIG. 7 is a front view of the present invention.
Figure 8:
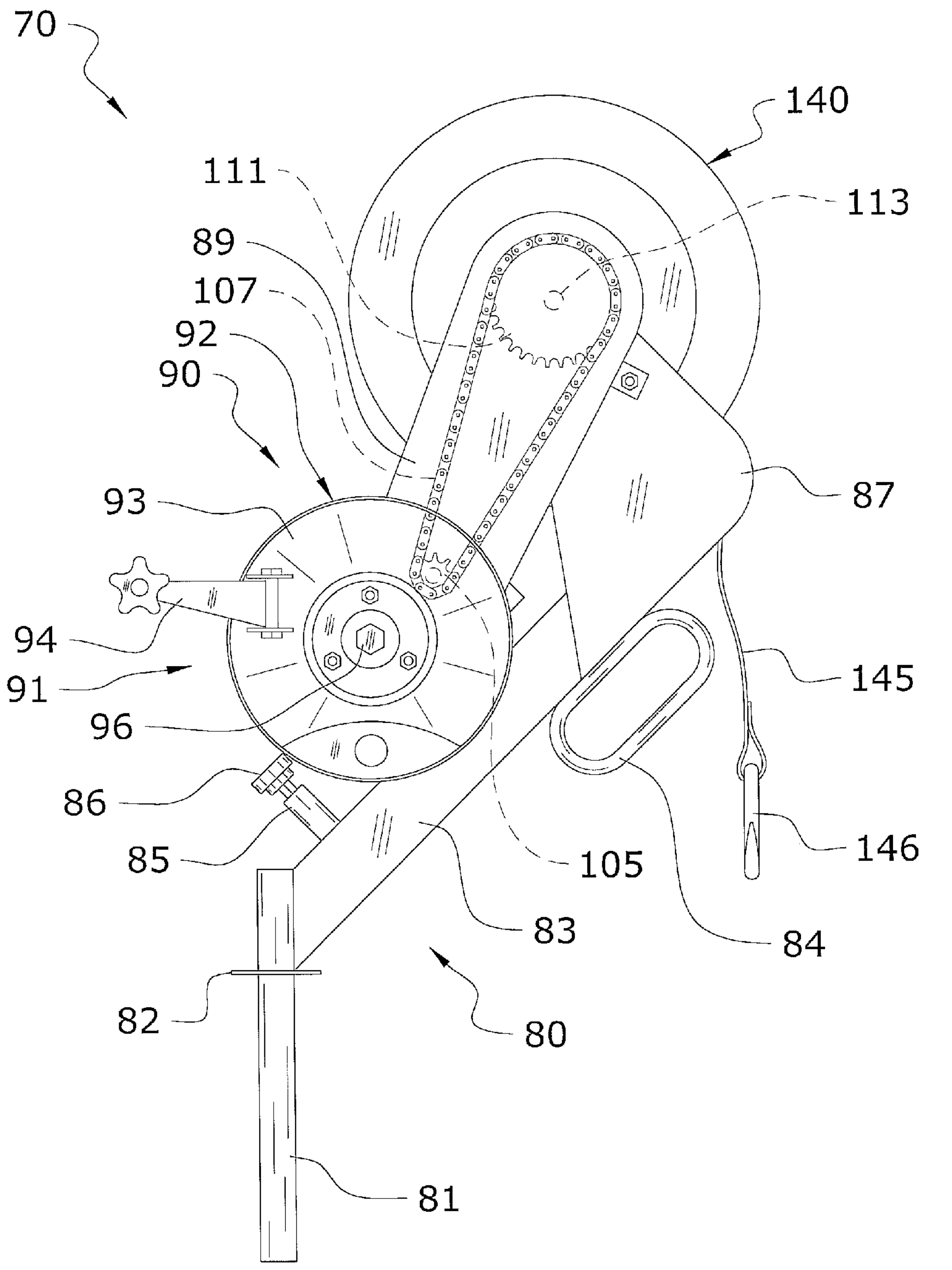
FIG. 8 is a side view of the mobile hoist system.

The winch includes a drive sprocket 62 connected to the main elongated member 54 as shown in FIG. 7 of the drawings. The slip clutch 40 includes a secondary sprocket 42 connected to the main elongated member 54. The slip clutch 40 is preferably comprised of a pair of friction members 44, 44' on opposing sides of the secondary sprocket 42 and a pair of plates 45, 45' positioned on opposite sides of the pair of friction members 44, 44' as shown in FIG. 6 of the drawings.

A spring 46 is preferably positioned adjacent to one of the plates 45, 45' to provide a biasing force on the friction members 44, 44' against the secondary sprocket 42 as shown in FIG. 6 of the drawings. A fastener nut may be utilized to selectively apply additional force upon the spring 46. The pair of plates 45, 45' are concentrically connected to a shaft and the secondary sprocket 42 is rotatably positioned upon the shaft to allow for free rotation about the same unless engaged by the friction members 44, 44'.

A first elongated member 30 is connected between the slip clutch 40 and the lower lifting member 22 as shown in FIG. 3 of the drawings. In particular, the first elongated member 30 is attached to another sprocket attached to the shaft supporting the slip clutch 40. The first elongated member 30 is used to lift and lower the lower lifting member 22 resulting in the corresponding lifting and lowering of the telescoping lifting members 24.

F. Operation of Preferred Embodiment.

In use, a load 12 (e.g. drywall sheet, etc.) is positioned upon the upper support 26 of the drywall lifter. Through the winch, rotational force is applied to the slip clutch 40 which in turn transfers the force to the telescoping structure of the drywall lifter. If the rotational force applied exceeds the second torque limit, then the slip clutch 40 correspondingly slips reducing the force applied to the telescoping lifting structure thereby preventing damage to the drywall lifter and to the load 12 being positioned. Once the load 12 is fully raised, the brake unit 50 is then set to prevent lowering of the load 12 by preventing rotation of the main elongated member 54. The load 12 may then be lowered by releasing the brake unit 50 and operating the winch accordingly.

If the load 12 increases in weight while the drywall lifter is either fully extended or partially extended (e.g. bricks or other objects positioned on the upper support 26 when in the raised position), the slip clutch 40 will release if the reverse torque applied by the load 12 exceeds the second torque limit. When the slip clutch 40 releases because of an excessively heavy load 12 (e.g. 500 pounds), the load 12 automatically lowers in a controlled and stable manner without applying a torque that exceeds the first torque limit of the brake unit 50. This prevents a free fall of the load 12 and also prevents damage to the drywall lifter. The excessively heavy load 12 continues to lower until the drywall lifter is fully retracted or the weight of the load 12 is reduced sufficiently to reduce the torque applied to the slip clutch 40 below the second torque limit.

II. Mobile Hoist System

A. Overview.

FIGS. 8 through 13 illustrate a mobile hoist system 70, which comprises a frame 80 removably connected to a support 73, a drive assembly 90 connected to the frame 80 and a driven assembly 110 connected to the frame 80, wherein the driven assembly 110 is mechanically connected to the drive assembly 90 via a main elongated member 107. The drive assembly 90 includes a winch 91 and a brake unit 100, wherein the brake unit 100 is connected to the winch 91 and wherein the brake unit 100 is capable of preventing lowering of a load 12 up to a first torque limit. The driven assembly 110 includes a drum 140 having a strap 145 wound thereon and a slip clutch 130 to brake the drum 140, wherein the slip clutch 130 prevents slippage up to a second torque limit, wherein the second torque limit is less than the first torque limit to prevent damage to the brake unit 100 by the load 12 having an excessive weight. It is appreciated that various components of the embodiment detailed in FIGS. 8 through 13 may be combined, interchanged, or otherwise altered to include or omit components of the embodiment detailed in FIGS. 2 through 7.

B. Frame.

Figure 9:
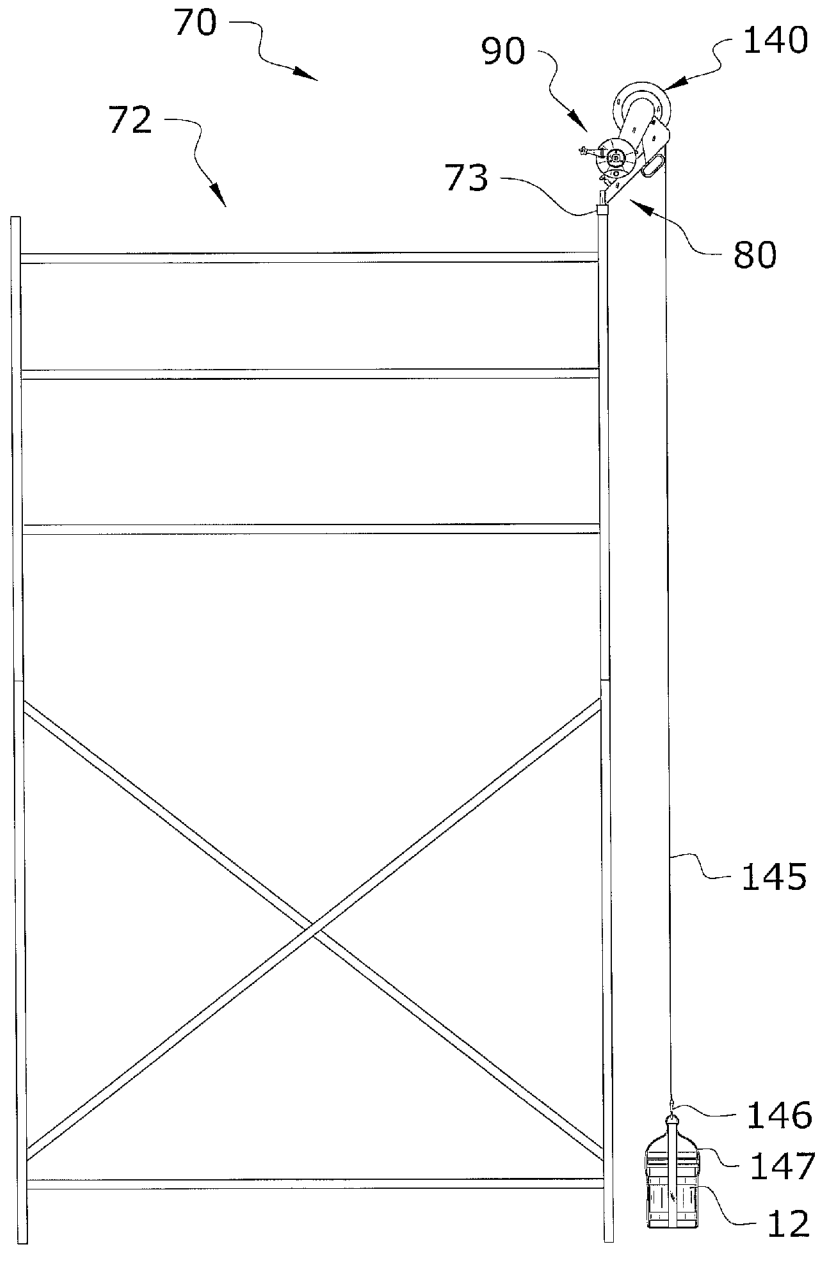
FIG. 9 is a side view of the mobile hoist system in use while connected to a scaffolding unit.
Figure 10:
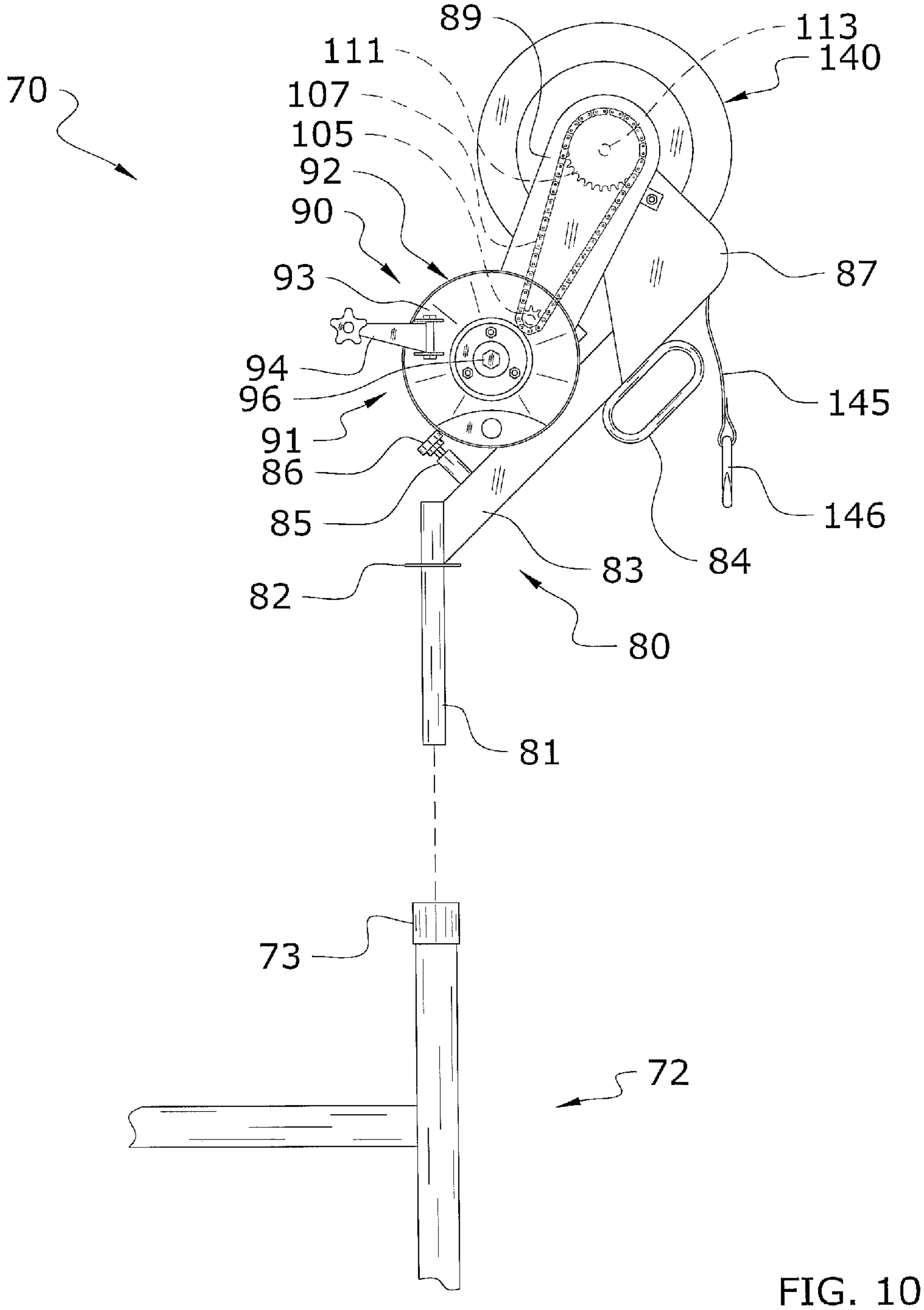
FIG. 10 is a side view of the mobile hoist system exploded from a support of the scaffolding unit.
Figure 11:
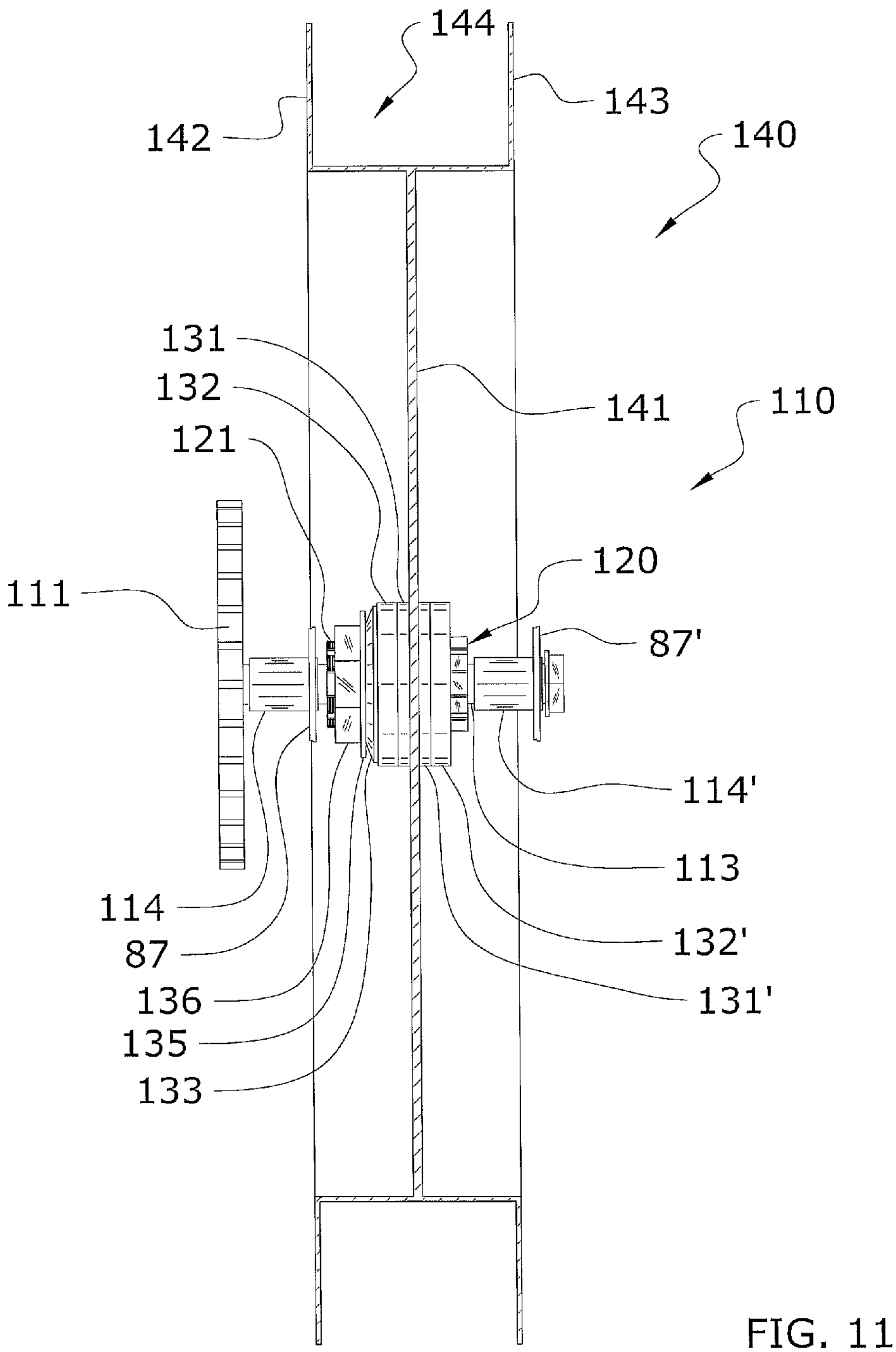
FIG. 11 is a front sectional view of the mobile hoist system taken through the center axis of the drum.
Figure 12:
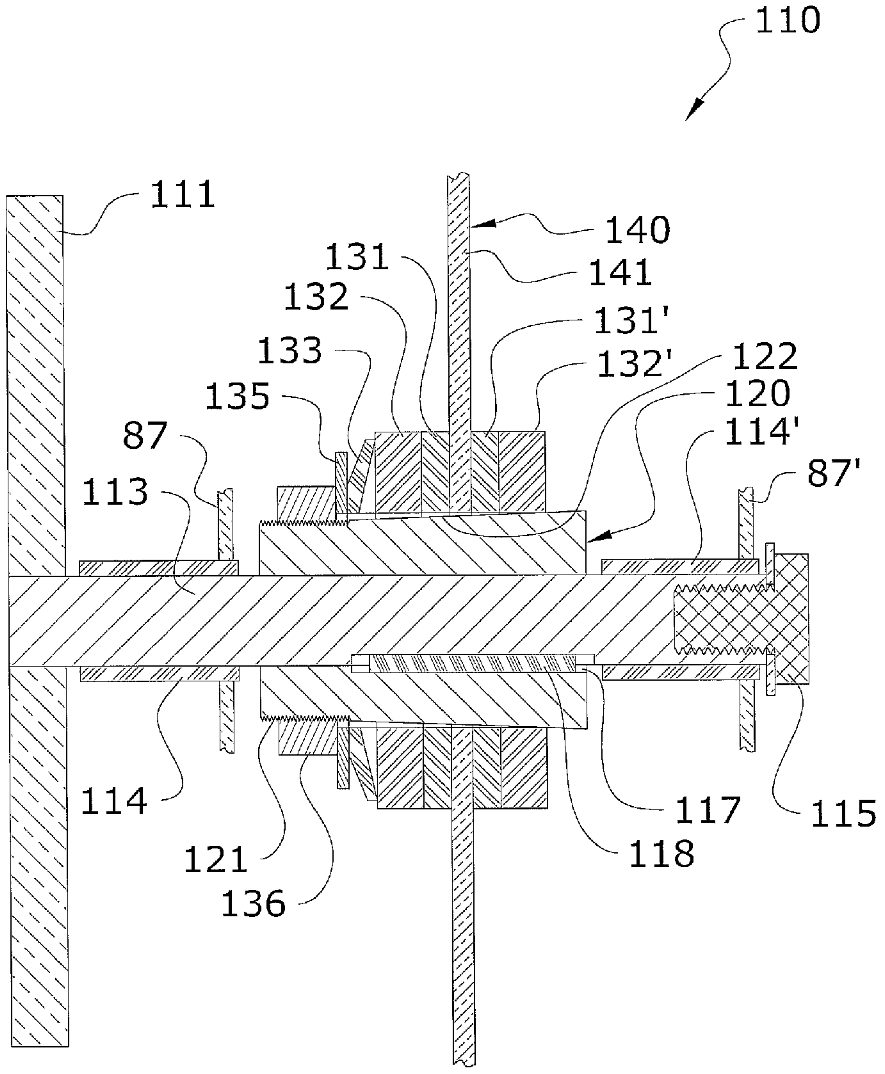
FIG. 12 is a front cross-sectional view of the driven assembly of the mobile hoist system.
Figure 13:
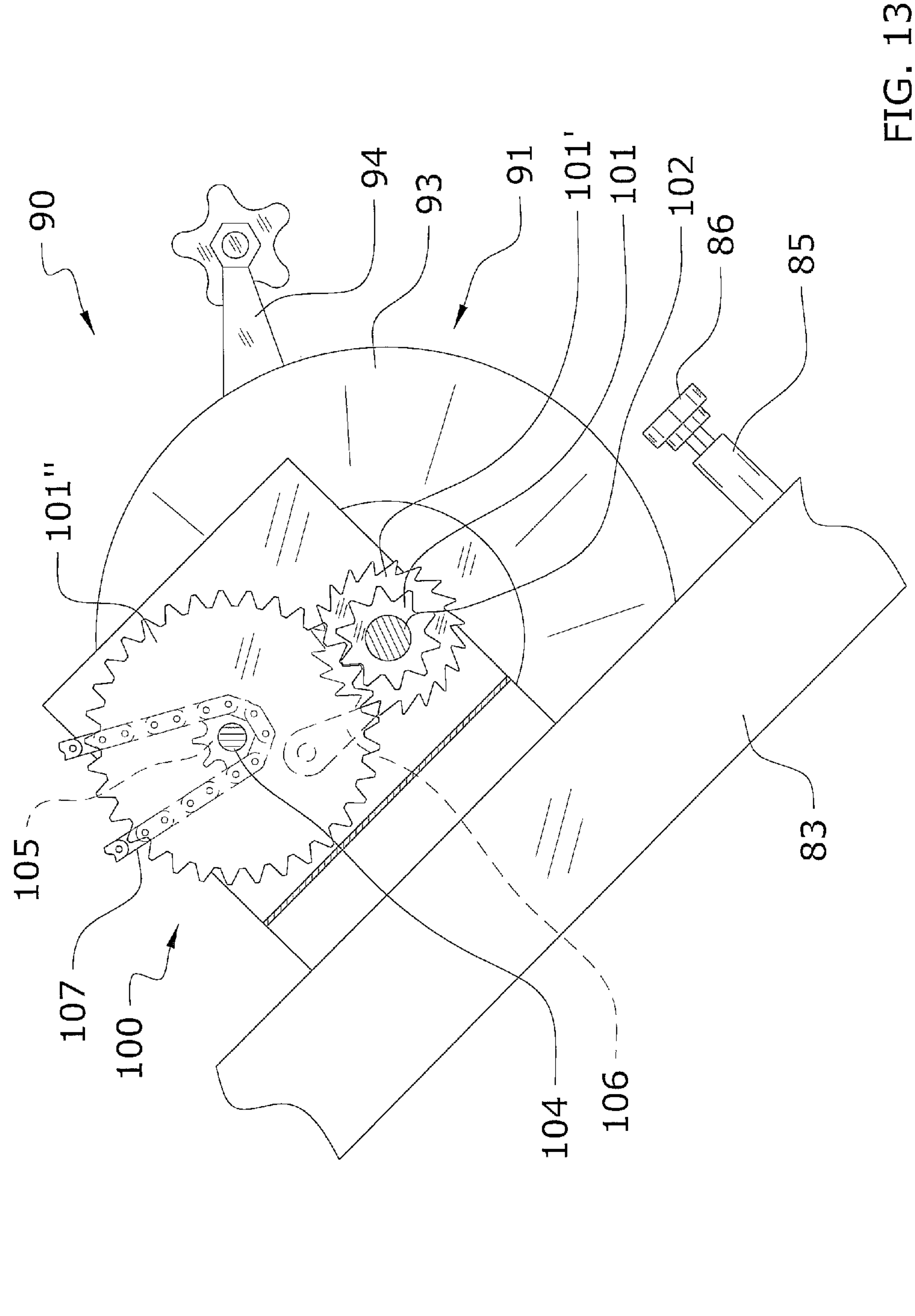
FIG. 13 is an opposing side view of the drive assembly illustrating the brake unit and connectivity of the winch.

The frame 80 of the mobile hoist system 70 may be mechanically connected to various support structures 72 where hoisting or lowering is needed, such as a drywall lifter or a scaffolding unit. FIGS. 9 and 10 illustrate an exemplary scaffolding unit 72. The frame 80 may vertically extend or horizontally extend from the support structure (e.g. scaffolding unit 72). It is appreciated that by vertically extending upwardly, gravity holds the frame 80 to the scaffolding unit 72. When horizontally extending, various pins 118 or connectors may be needed to fasten the frame 80 to the scaffolding unit 72. The frame 80 may further be removably connected to fastened in a fixed manner to the support structure 73.

The mobile hoist system 70 generally includes a frame 80 including a connector support 73 that is connected to a support 73 of the scaffolding unit 72. The connector support 73 and support 73 of the scaffolding unit 72 may connect in various manners, such as slidably via a telescopic connection or various other manners. For instance, the connector support 73, may extend within a similar cross-sectional shaped support 73 of the scaffolding unit 72 or vice versa.

The frame 80 is removable from the scaffolding unit 72 or other structure and comprised of a lightweight structure to be easily carried from workplace to workplace. Various adapter pieces may be used to ensure a secure connection between the frame 80 and the scaffolding unit 72 or other support structure.

A stopper flange 82 extends outwardly from the connector support 73 at an end opposite to that receiving the support 73 of the scaffolding unit 72. The stopper flange 82 preferably surrounds the connector support 73 to provide a stopping point for the connector support 73 when inserted within the support 73 of the scaffolding unit 72.

The frame 80 also includes an angled support 83, multiple drum supports 87, 87' and one or more covers 89 extending over various moving components (e.g. sprockets, elongated members) all of which allows the frame 80 to be mobile yet remain rigid to raise and lower heavy loads 12. A handle 84 may also be connected to the frame 80 preferably to a bottom side of the angled support 83 for carrying the mobile hoist system 70.

A holding piece 85 may also extend from the frame 80 and preferably the upper side of the angled support 83. The holding piece 85 is for holding the adapter 86 that is used for connecting to the second drive unit 96 of the dual drive winch 91. The adapter 86 generally resembles a socket that is connectable to a powered drill to be rotated and thus rotate the second drive unit 96. The holding piece 85 may be lined in an interior space with a rubber or resilient material to efficiently grab the adapter 86 and retain the adapter 86 within during non use.

C. Drive Assembly.

A drive assembly 90 is connected to the frame 80 for powering the driven assembly 110 to wind or unwind the strap 145 from the drum 140 and thus raise or lower the load connected thereto. The drive assembly 90 is mobile along with the frame 80 and thus is comprised of a substantially lightweight and independently operated structure.

The drive assembly 90 generally includes a winch 91 and a brake unit 100 rotatably coupled to the winch 91. The winch 91 may be comprised of a configuration as shown in FIGS. 2 through 7 and described above or may be comprised of a dual drive structure capable of being used by either manual rotation or powered rotation. The dual drive structure includes a first drive unit 92 comprised of a rotatable circular disc 93 including a pivotal hand crank 94 to rotate the disc 93. The dual drive structure also includes a second drive unit 96 generally comprised of a hex bolt structure that is received by the adapter 86 rotated by a rotating external motor, such as a powered drill. The first drive unit 92 and the second drive unit 96 generally rotate on the same axis. Either drive unit 92, 96 accomplishes the same of raising or lowering the load 12. U.S. Pat. No. 7,484,713 (dual drive winch system) to Larry Young illustrates an example of a dual drive winch system that may be utilized within the present invention and is hereby incorporated by reference herein.

The brake unit 100 is rotatably coupled to the winch 91 and generally includes a plurality of gears 101, 101', 101" for transferring a rotational force from the shaft 102 connecting the winch 91 to the shaft 104 of the brake unit 100 where a drive sprocket 105 is mounted upon. Thus as the winch 91 is rotated, the gears 101, 101', 101" of the brake unit 100 are caused to rotate which causes the spool and thus shaft 104 of the brake unit 100 to rotate and thus drive sprocket 105 to rotate which is mounted thereon.

Similar to the embodiment detailed in FIGS. 2 through 7, the brake unit 100 includes a manually operable spring loaded control lever 106 for engaging at least one gear 101' of the brake unit 100 to stop a rotation of the gears 101, 101', 101" and the shaft 104 and this drive sprocket 105. Like FIGS. 2 through 7 embodiment, the brake unit 100 is capable of preventing lowering of the load 12 up to a first torque limit which is comprised of a torque level that results in failure of the brake unit 100.

D. Driven Assembly.

The driven assembly 110 is mechanically connected to the drive assembly 90 via the main elongated member 107 and is used to raise and lower the strap 145 wound upon the drum 140. The main elongated member 107 is connected between the drive assembly 90 and the driven assembly 110 and more preferably between the drive sprocket 105 of the drive assembly 90 and the secondary sprocket 111 of the driven assembly 110 to transfer mechanical force between the same. The main elongated member 107 is comprised of an endless loop structure such as but not limited to a chain or cable.

The driven assembly 110 includes an elongated shaft 113 having the secondary sprocket 111 mounted on one end for rotating the shaft 113 via the main elongated member 107 and a drum 140 separately mounted upon the shaft 113 near the center of the shaft 113. Bushings 114, 114' are situated upon the shaft 113 on each side of the drum 140 for attaching the drum supports 87, 87' of the frame 80 thereto so that the shaft 113 and thus drive assembly 90 may be supported by the frame 80. A washer and fastener 115 may be threaded on the end of the shaft 113 opposite the secondary sprocket 111 to ensure that the bushing 114, 114' remains in place.

A sleeve 120 is positioned around the longitudinal center portion of the shaft 113 for holding the drum 140. The sleeve 120 is rotatably coupled to the shaft 113 via a keyway 117 and a key 118 connecting the sleeve 120 to the shaft 113. The outer perimeter of the sleeve 120 includes a threaded portion 121 at one end and a tapered portion 122 forming a tapered outer surface extending from the threaded portion 121 towards the other end.

The drum 140 includes an inner support 141 that forms a central rotating element of the drum 140 in which a first flange 142 and a second flange 143 are supported to house the strap 145 that is wound upon the drum 140 between the first flange 142 and the second flange 143. The first flange 142 and the second flange 143 form a cavity 144 there between for receiving the strap 145. The term “strap” referring to element 145 may refer to a conventional strap or a cable, chain, rope, or various elongated members that may be wound upon the drum 140.

The inner support 141 of the drum 140 is rotatably mounted to the sleeve 120 around the tapered portion 122. The slip clutch 130 is also mounted to the sleeve 120 around the tapered portion 122 and is situated on both sides of the inner support 141 of the drum 140 to brake the drum 140 from free rotation when a torque less than the second torque is applied. When a torque equal to or greater than the second torque limit is applied the slip clutch 130 allows the drum 140 to slowly slip so as to rotate and thus not causing damage to the frame 80 or scaffolding unit 72 by exceeding a respective weight limit.

The slip clutch 130 is preferably adjustable to allow for adjustment of the second torque limit depending upon the application of usage. As stated earlier, the second torque limit is less than the first torque limit to prevent damage to the brake unit 100 by the load having an excessive weight. It is preferable that the second torque limit is significantly less than the first torque limit to prevent continued exposure of the brake unit 100 to excessively heavy loads 12 (e.g. 500 pounds or more).

Like the embodiment in FIGS. 2 through 7, the slip clutch 130 in FIGS. 8 through 13 include a pair of friction members 131, 131' and a pair of plates 132, 132' positioned on the outside of the friction members 131, 131'. The friction members 131, 131' are positioned upon opposite sides of the inner support 141 of the drum 140. A beveled washer 133 is positioned between a lock washer 135 secured by a fastener (e.g. nut) on the threaded portion 121 of the sleeve 120 and one of the plates 132, 132'. As the drum 140 rotates the inner support 141, friction members 131, 131', and plates 132, 132' slide along the tapered portion 122 of the sleeve 120 towards the beveled washer 133 and tightly sandwich the beveled washer 133 between the adjacent plate 132, 132' and the lock washer 135 which prevents the drum 140 from continually rotating in a free manner with respect to the sleeve 120 because the friction members 131, 131' are also forced to tightly squeeze the inner support 141 of the drum 140 which prevents the inner support 141 and thus drum 140 from rotating.

The fastener 136 may be adjusted along the threadable portion to adjust the second torque limit as desired by moving the beveled washer 133 closer or further from the plates 132, 132'. The inner support 141 is able to slowly slip thus unraveling the strap 145 from the drum 140 once the second torque limit is exceeded to prevent the frame 80, scaffolding unit 72, or other components from breaking or being damaged. It is appreciated that when the second torque limit is exceeded, the outward force applied upon the strap 145 is greater than the friction force applied upon the inner support 141 by the friction members 131, 131'.

E. Operation of Preferred Embodiment.

In use, the connecting support 81 is removably inserted within a hollow support 73 of the scaffolding unit 72 preferably in a manner so that the connecting support 81 is vertical and extends from an upper end of the scaffolding unit 72 near a perimeter. A load 12 (e.g. drywall sheet, pail, etc.) is positioned within the carrying support 147 and secured therein. A hook 146 extending from the strap 145 is then secured upon the carrying support 147.

Through the winch 91, rotational force is applied to the brake unit 100 and drive sprocket 105 which in turn transfers the force to the secondary sprocket 111 that rotates the shaft 113 and drum 140. The drum 140 and slip clutch 130 slide along the tapered portion 122 of the sleeve 120 to tighten the friction members 131, 131' against the inner support 141 of the drum 140 thus forcing the drum 140 to correspondingly rotate with the sleeve 120 and shaft 113 and not allow the drum 140 to rotate freely. If the rotational force applied exceeds the second torque limit, then the drum 140 correspondingly slips between the friction members 131, 131' of the slip clutch 130 reducing the force applied to the frame 80 and scaffolding structure 72 thereby preventing damage to the mobile hoist system 70, scaffolding structure 72 and to the load 12 being positioned. Once the load 12 is frilly raised, the control lever 106 of the brake unit 100 is then set to prevent lowering of the load 12 by preventing rotation of the main elongated member 107. The load 12 may then be lowered by releasing the control lever 106 of the brake unit 100 and operating the winch 91 accordingly.

If the load increases in weight while the strap 145 is either fully extended or partially extended, the slip clutch 130 will release if the reverse torque applied by the load 12 exceeds the second torque limit. When the slip clutch 130 releases because of an excessively heavy load (e.g. 500 pounds), the load 12 automatically lowers in a controlled and stable manner without applying a torque that exceeds the first torque limit of the brake unit 100. This prevents a free fall of the load 12 and also prevents damage to the scaffolding unit 72 and mobile hoist system 70. The excessively heavy load 12 continues to lower until the strap 145 is fully retracted or the weight of the load 12 is reduced sufficiently to reduce the torque applied to the slip clutch 130 below the second torque limit.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A mobile hoist system, comprising:

a frame removably connected to a support structure;

a drive assembly connected to said frame;

wherein said drive assembly includes a winch and a brake unit, wherein said brake unit is connected to said winch;

wherein said brake unit is capable of preventing lowering of a load up to a first torque limit;

a driven assembly connected to said frame, wherein said driven assembly is mechanically connected to said drive assembly;

wherein said driven assembly includes a drum having a strap wound thereon and a slip clutch to brake said drum;

wherein said slip clutch prevents slippage up to a second torque limit, wherein said second torque limit is less than said first torque limit to prevent damage to said brake unit by said load having an excessive weight;

wherein said slip clutch is comprised of a pair of friction members on opposing sides of said drum and a pair of plates positioned on opposite sides of said pair of friction members; and a main elongated member connected between said drive assembly and said driven assembly.

2. The mobile hoist system of claim 1, wherein said winch is comprised of a dual drive winch operable by either a manual force or a powered force.

3. The mobile hoist system of claim 1, wherein said brake unit includes a drive sprocket connected to said main elongated member and wherein said driven assembly includes a secondary sprocket connected to said main elongated member.

4. The mobile hoist system of claim 3, wherein said secondary sprocket is rotatably coupled to a shaft, wherein said shaft supports said drum.

5. The mobile hoist system of claim 4, wherein said slip clutch and said drum are concentrically connected to a tapered sleeve, wherein said tapered sleeve surrounds said shaft.

6. The mobile hoist system of claim 1, wherein said slip clutch includes a beveled washer adjacent to one of said pair of plates.

7. The mobile hoist system of claim 1, wherein said slip clutch is adjustable to allow adjustment of said second torque limit.

8. The mobile hoist system of claim 1, wherein said main elongated member is comprised of an endless loop structure.

9. The mobile hoist system of claim 1, wherein said support structure is comprised of a scaffolding unit.

10. A mobile hoist system, comprising:

a frame removably connected to a support structure;

a drive assembly connected to said frame;

wherein said drive assembly includes a winch and a brake unit, wherein said brake unit is connected to said winch;

wherein said brake unit is capable of preventing lowering of a load up to a first torque limit;

wherein said brake unit includes a drive sprocket;

a driven assembly connected to said frame;

wherein said driven assembly includes a secondary sprocket;

wherein said driven assembly includes a drum having a strap wound thereon and a slip clutch to brake said drum;

wherein said slip clutch is comprised of a pair of friction members on opposing sides of said drum and a pair of plates positioned on opposite sides of said pair of friction members;

wherein said slip clutch prevents slippage up to a second torque limit, wherein said second torque limit is less than said first torque limit to prevent damage to said brake unit by said load having an excessive weight; and a main elongated member connected between said drive sprocket and said secondary sprocket.

11. The mobile hoist system of claim 10, wherein said winch is comprised of a dual drive winch operable by either a manual force or a powered force.

12. The mobile hoist system of claim 10, wherein said secondary sprocket is rotatably coupled to a shaft, wherein said shaft supports said drum.

13. The mobile hoist system of claim 12, wherein said slip clutch and said drum are concentrically connected to a tapered sleeve, wherein said tapered sleeve surrounds said shaft.

14. The mobile hoist system of claim 13, wherein said slip clutch includes a beveled washer adjacent to one of said pair of plates.

15. The mobile hoist system of claim 10, wherein said slip clutch is adjustable to allow adjustment of said second torque limit.

16. The mobile hoist system of claim 10, wherein said main elongated member is comprised of an endless loop structure.

17. The mobile hoist system of claim 10, wherein said support structure is comprised of a scaffolding unit.

18. A mobile hoist system for removably connecting to a tubular support of a scaffolding unit, comprising:

a frame removably connected to said tubular support of said scaffolding unit;

wherein said frame includes a connecting support, an angled support extending from said connecting support, and at least one drum support extending from said angled support;

wherein said frame includes a stopper flange surrounding said connecting support;

wherein said frame includes a handle extending from said angled support;

wherein said frame includes a holding piece for securing an adapter;

a drive assembly connected to said frame;

wherein said drive assembly includes a winch and a brake unit, wherein said brake unit is connected to said winch;

wherein said winch is comprised of a dual drive winch operable by either a manual force or a powered force;

wherein said brake unit is capable of preventing lowering of a load up to a first torque limit;

wherein said brake unit includes a drive sprocket;

a driven assembly connected to said frame;

wherein said driven assembly includes a secondary sprocket;

wherein said driven assembly includes a drum having a strap wound thereon and a slip clutch to brake said drum;

wherein said secondary sprocket is rotatably coupled to a shaft, wherein said shaft supports said drum;

wherein said slip clutch and said drum are concentrically connected to a tapered sleeve, wherein said tapered sleeve surrounds said shaft;

wherein said tapered sleeve is rotatably coupled to said shaft;

wherein said slip clutch is comprised of a pair of friction members on opposing sides of said drum and a pair of plates positioned on opposite sides of said pair of friction members;

wherein said slip clutch includes a beveled washer adjacent to one of said pair of plates;

wherein said slip clutch is adjustable to allow adjustment of said second torque limit;

wherein said slip clutch prevents slippage up to a second torque limit, wherein said second torque limit is less than said first torque limit to prevent damage to said brake unit by said load having an excessive weight; and a main elongated member connected between said drive sprocket and said secondary sprocket;

wherein said main elongated member is comprised of an endless loop structure.

* * * * *